(12) United States Patent
Pywell et al.

(10) Patent No.: US 9,085,246 B1
(45) Date of Patent: Jul. 21, 2015

(54) VEHICLE SEAT STABILIZATION ASSEMBLY

(71) Applicant: GM GLOBAL TECHNOLOGY OPERATIONS LLC, Detroit, MI (US)

(72) Inventors: James F. Pywell, Shelby Township, MI (US); Leigh A. Berger, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 14/157,846

(22) Filed: Jan. 17, 2014

(51) Int. Cl.
*B60N 2/12* (2006.01)
*B60N 2/16* (2006.01)
*B60N 2/18* (2006.01)
*B60N 2/07* (2006.01)
*B60N 2/08* (2006.01)

(52) U.S. Cl.
CPC .. *B60N 2/07* (2013.01); *B60N 2/08* (2013.01); *B60N 2/165* (2013.01); *B60N 2/1615* (2013.01); *B60N 2/1864* (2013.01)

(58) Field of Classification Search
CPC ..... B60N 2/165; B60N 2/1615; B60N 2/1864
USPC ............. 297/344.11, 344.12, 344.13, 344.14, 297/344.15, 344.17; 248/421, 429, 430
See application file for complete search history.

(56) References Cited

U.S. PATENT DOCUMENTS

| 4,043,529 | A | * | 8/1977 | Pickles | 297/344.13 X |
|---|---|---|---|---|---|
| 4,209,158 | A | * | 6/1980 | Pickles | 248/421 |
| 4,470,632 | A | * | 9/1984 | Babbs | 297/344.13 X |
| 4,765,582 | A | * | 8/1988 | Babbs | 297/344.17 X |
| 4,948,081 | A | * | 8/1990 | Hatta | 248/421 X |
| 5,014,958 | A | * | 5/1991 | Harney | 297/344.13 X |
| 5,109,963 | A | * | 5/1992 | Husted et al. | 297/344.12 X |
| 5,743,591 | A | | 4/1998 | Tame | |
| 5,797,574 | A | * | 8/1998 | Brooks et al. | 297/344.15 X |
| 5,868,472 | A | | 2/1999 | Grilliot et al. | |
| 6,273,507 | B1 | * | 8/2001 | Downey | 297/344.15 |
| 6,309,019 | B1 | * | 10/2001 | Downey et al. | 297/344.17 X |
| 6,488,337 | B1 | * | 12/2002 | De Voss et al. | 297/344.13 |
| 7,066,540 | B2 | * | 6/2006 | Minai et al. | 297/344.15 |
| 7,137,330 | B2 | | 11/2006 | Christopher | |
| 7,654,615 | B2 | * | 2/2010 | Ventura et al. | 297/344.15 |
| 7,963,603 | B2 | | 6/2011 | Pywell | |
| 7,963,605 | B2 | * | 6/2011 | Ramaseshadri et al. | 297/344.15 |
| 8,052,112 | B2 | * | 11/2011 | Lawall et al. | 297/344.11 X |
| 8,177,280 | B2 | * | 5/2012 | Yamada et al. | 297/344.17 X |
| 8,590,971 | B2 | * | 11/2013 | Ito et al. | 297/344.15 |
| 8,616,645 | B2 | * | 12/2013 | Ito | 297/344.17 |

(Continued)

*Primary Examiner* — Rodney B White
(74) *Attorney, Agent, or Firm* — Quinn Law Group, PLLC

(57) ABSTRACT

A stabilization assembly for a vehicle includes a vehicle seat and a slide assembly. The vehicle seat includes a first frame member, a second frame member spaced opposite the first frame member, and a torque tube disposed between and attached to the first frame member and the second frame member. The slide assembly includes a track defining a channel therein, a rail translatable within the channel, and a bracket attached to the rail. A lift linkage interconnects the vehicle seat and the slide assembly, is attached to the bracket and the torque tube, and is rotatable with respect to the bracket about a pivot axis. The stabilization assembly also includes a locking sprocket attached to the bracket, rotatable about the pivot axis during a non-energy management condition, and not rotatable about the pivot axis during an energy management condition. A vehicle including the stabilization assembly is also disclosed.

20 Claims, 4 Drawing Sheets

(56) References Cited

U.S. PATENT DOCUMENTS

| | | |
|---|---|---|
| 2002/0140278 A1* | 10/2002 | Hlavaty et al. ............... 297/464 |
| 2002/0145315 A1 | 10/2002 | Fraley et al. |
| 2003/0102701 A1* | 6/2003 | Pedronno et al. .......... 297/216.1 |
| 2005/0275267 A1* | 12/2005 | Schumann et al. ...... 297/344.12 |
| 2006/0196715 A1 | 9/2006 | Fujishiro et al. |
| 2008/0093899 A1 | 4/2008 | Stueckle |
| 2009/0058158 A1* | 3/2009 | Sobieski ............. 297/344.15 X |
| 2009/0236884 A1* | 9/2009 | Lawall et al. ............. 297/217.3 |
| 2010/0013285 A1* | 1/2010 | Stanz et al. ............. 297/344.13 |
| 2012/0306252 A1* | 12/2012 | Ligonniere et al. ........ 297/354.1 |
| 2013/0099539 A1* | 4/2013 | Fienup et al. ................. 297/325 |

* cited by examiner

VEHICLE SEAT STABILIZATION ASSEMBLY

TECHNICAL FIELD

The disclosure relates to a stabilization assembly for a vehicle.

BACKGROUND

Vehicle seats are often adjustable according to occupant size to provide for occupant comfort. For example, a vehicle seat may translate along a vertical axis between a raised position and a lowered position. Similarly, the vehicle seat may translate along a horizontal axis between a fore position and an aft position to compensate for differences in occupant size and provide for occupant comfort.

SUMMARY

A stabilization assembly for a vehicle includes a vehicle seat and a slide assembly. The vehicle seat includes a first frame member, a second frame member spaced opposite the first frame member, and a torque tube disposed between and attached to the first frame member and the second frame member. The slide assembly includes a track defining a channel therein, a rail translatable within the channel, and a bracket attached to the rail. In addition, the stabilization assembly includes a lift linkage that interconnects the vehicle seat and the slide assembly. The lift linkage is attached to the bracket and the torque tube and is rotatable with respect to the bracket about a pivot axis. The stabilization assembly also includes a locking sprocket attached to the bracket. The locking sprocket is rotatable about the pivot axis during a non-energy management condition and is not rotatable about the pivot axis during an energy management condition.

In one embodiment, the vehicle seat is translatable along a vertical axis between a lowered position and a raised position, and along a horizontal axis that is substantially perpendicular to the vertical axis between a fore position and an aft position. The rail is translatable within the channel along the horizontal axis, and the lift linkage is rotatable with respect to the bracket about a pivot axis that is substantially perpendicular to the horizontal axis and the vertical axis. The lift linkage is rotatable about the pivot axis in a first direction to translate the vehicle seat from the lowered position to the raised position, and in a second direction that is opposite the first direction to translate the vehicle seat from the raised position to the lowered position. The stabilization assembly also includes a brace coupled to the lift linkage and selectively rotatable about the pivot axis. The locking sprocket and the lift linkage are rotatable about the pivot axis in the first direction and the second direction during a non-energy management condition so that the vehicle seat is translatable between the raised position and the lowered position. The locking sprocket and the lift linkage are not rotatable about the pivot axis in the second direction during an energy management condition so that the vehicle seat is not translatable from the raised position to the lowered position.

A vehicle includes a floor, a plurality of mounts attached to the floor, and a stabilization assembly attached to the plurality of mounts. The stabilization assembly includes a vehicle seat and a slide assembly. The vehicle seat includes a first frame member, a second frame member spaced opposite the first frame member, and a torque tube disposed between and attached to the first frame member and the second frame member. The slide assembly includes a track defining a channel therein and coupled to the plurality of mounts, a rail translatable within the channel, and a bracket attached to the rail. The stabilization assembly also includes a lift linkage that interconnects the vehicle seat and the slide assembly. The lift linkage is attached to the bracket and the torque tube and is rotatable with respect to the bracket about a pivot axis. The stabilization assembly further includes a locking sprocket attached to the bracket. The locking sprocket is rotatable about the pivot axis during a non-energy management condition and is not rotatable about the pivot axis during an energy management condition.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
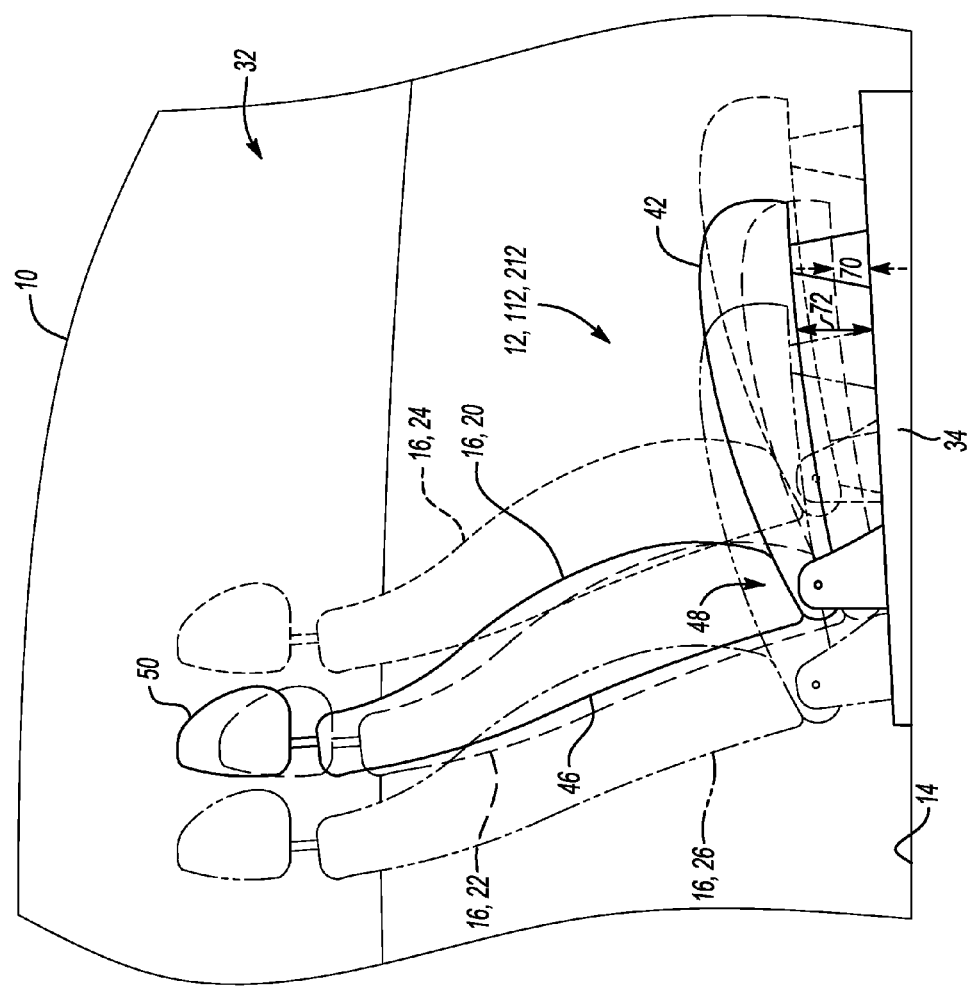
FIG. 1 is a schematic illustration of a partial side view of a stabilization assembly for a vehicle, wherein the stabilization assembly includes a vehicle seat disposed in a raised position and translatable between the raised position, a lowered position, a fore position, and an aft position during a non-energy management condition.
Figure 1:
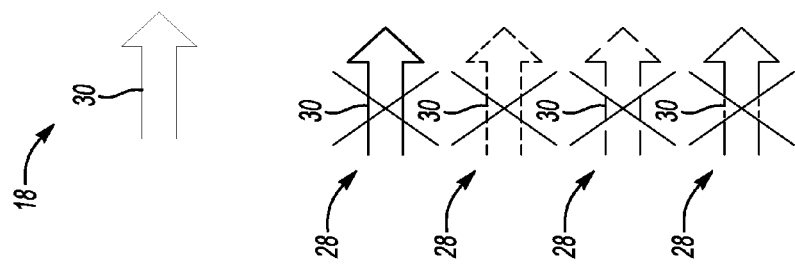

Referring to the Figures, wherein like reference numerals refer to like elements, a vehicle 10 including a stabilization assembly 12, 112, 212 is shown generally in FIG. 1. The stabilization assembly 12, 112, 212 may be configured for minimizing downward displacement, i.e., displacement towards a floor 14 of the vehicle 10, of a portion of a vehicle seat 16 during an energy management condition (represented generally at 18). The energy management condition 18 may occur, for example, when an external force 30 is applied to the vehicle 10 such that the vehicle 10 absorbs energy. The stabilization assembly 12, 112, 212 may also be configured for permitting translation of the vehicle seat 16 between a raised position 20, a lowered position 22, a fore position 24, and an aft position 26 during a non-energy management condition (represented generally at 28). The non-energy management condition 28 may occur when no external force 30 is applied to the vehicle 10. As such, the stabilization assembly 12, 112, 212 may be useful for automotive vehicles 10 including passenger cars, sport utility vehicles, and trucks. However, it is to be appreciated that the stabilization assembly 12, 112, 212 may also be useful for non-automotive applications, such as, but not limited to, aviation, rail, marine, and recreational vehicle applications.

Referring again to FIG. 1, the vehicle 10 defines a passenger compartment 32 and includes the floor 14 and a plurality of mounts 34 attached to the floor 14. The plurality of mounts 34 may be configured for supporting the stabilization assembly 12, 112, 212 and may position the stabilization assembly 12, 112, 212 at a suitable height within the passenger compartment 32. More specifically, the stabilization assembly 12, 112, 212 may be attached to the plurality of mounts 34, e.g., by attachment devices such as bolts or welds.

With continued reference to FIG. 1, the stabilization assembly 12, 112, 212 includes the vehicle seat 16. The vehicle seat 16 may be configured for supporting an occupant (not shown) of the vehicle 10, such as a driver or any passenger of the vehicle 10.

Figure 2:
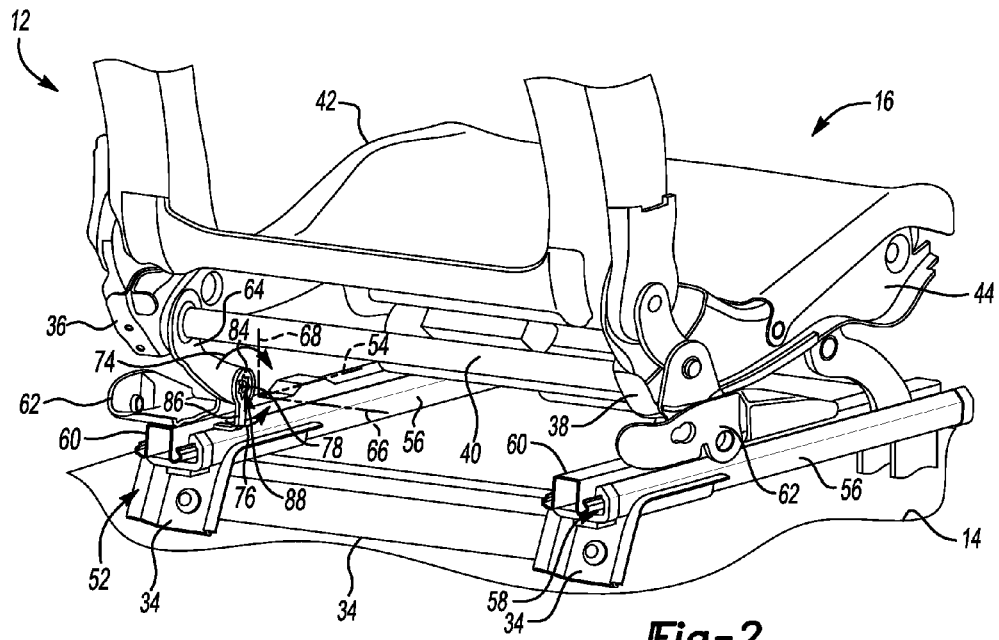
FIG. 2 is a schematic illustration of a partial perspective rear view of the stabilization assembly of FIG. 1, wherein the stabilization assembly includes a lift linkage, a locking sprocket, and a brace.

More specifically, as best shown in FIG. 2, the vehicle seat 16 includes a first frame member 36 and a second frame member 38 spaced opposite the first frame member 36. That is, the first frame member 36 and the second frame member 38 may be portions of a frame 44 and may form a seat cushion 42 configured for supporting an occupant seated thereon. The seat cushion 42 may be covered and/or encased with a material such as, but not limited to, foam, e.g., polyurethane foam, fabric, and combinations thereof to enhance occupant comfort.

Referring again to FIG. 1, the vehicle seat 16 may further include a seat back 46 configured for supporting a torso of the occupant seated on the seat cushion 42. The seat back 46 may also be covered and/or encased with a material such as, but not limited to, foam, e.g., polyurethane foam, fabric, and combinations thereof. The seat cushion 42 and the seat back 46 may be arranged and pivotably coupled in an L-shape to support the occupant during vehicle operation. That is, the seat cushion 42 and seat back 46 may be coupled at a pivot point 48 to allow the occupant to adjust the vehicle seat 16 according to individual comfort preferences.

Further, with continued reference to FIG. 1, the vehicle seat 16 may include a head rest 50. The head rest 50 may be, for example, an adjustable head rest, a non-adjustable head rest, a head rest integrated into the seat back 46, or a head rest distinct from the seat back 46.

Referring now to FIG. 2, the vehicle seat 16 also includes a torque tube 40 disposed between and attached to the first frame member 36 and the second frame member 38. The torque tube 40 may minimize torsion of the seat cushion 42. That is, since the torque tube 40 is disposed between and attached to the first frame member 36 and the second frame member 38, the torque tube 40 may minimize twisting and/or bending of the first frame member 36 with respect to the second frame member 38. For example, the torque tube 40 may provide support for the first frame member 36 and the second frame member 38 to ensure that vertical displacement of each side of the frame 44 is synchronized during adjustment of the vehicle seat 16. As such, the torque tube 40 may be disposed parallel to two sides of the frame 44 and perpendicular to another two sides of the frame 44 of the vehicle seat 16. The torque tube 40 may be attached to the first frame member 36 and the second frame member 38 via any suitable attachment device, such as, but not limited to, welds, bolts, and screws.

With continued reference to FIG. 2, the stabilization assembly 12, 112, 212 also includes a slide assembly 52. The slide assembly 52 may be configured for translating the vehicle seat 16 along a horizontal axis 54. In particular, the slide assembly 52 includes a track 56 defining a channel 58 therein, and a rail 60 translatable within the channel 58. The track 56 may be coupled to the plurality of mounts 34. More specifically, the stabilization assembly 12, 112, 212 may include two rails 60 each disposed parallel to one another and situated between the floor 14 and a respective first frame member 36 and second frame member 38 of the vehicle seat 16. Further, the slide assembly 52 includes a bracket 62 attached to the rail 60.

Figure 3:
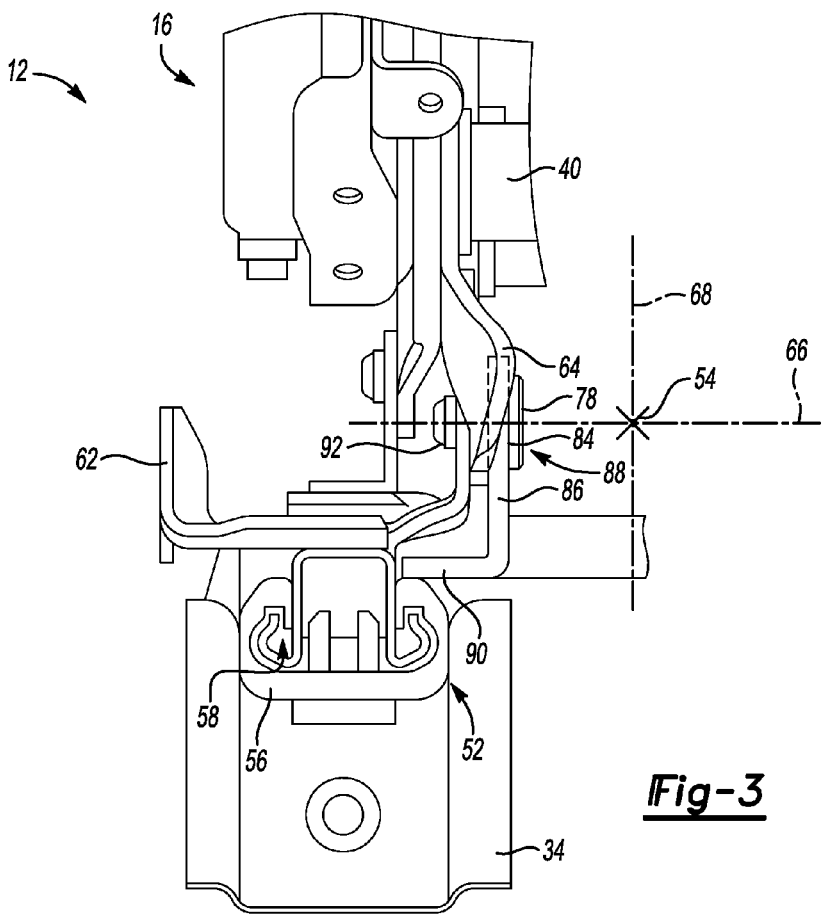
FIG. 3 is a schematic illustration of a partial end view of the lift linkage, locking sprocket, and brace of FIG. 2.

As best shown in FIGS. 2 and 3, the stabilization assembly 12, 112, 212 further includes a lift linkage 64 interconnecting the vehicle seat 16 and the slide assembly 52. The lift linkage 64 is attached to the bracket 62 and the torque tube 40 and is rotatable with respect to the bracket 62 about a pivot axis 66.

More specifically, as described with reference to FIG. 2, the lift linkage 64 may mechanically move the vehicle seat 16 between the lowered position 22 (FIG. 1) and the raised position 20 (FIG. 1). That is, the lift linkage 64 may be configured for raising or lowering the vehicle seat 16 with respect to the floor 14 (FIG. 1) and may provide adjustability of the vehicle seat 16 according to occupant height and/or comfort preferences. As shown in FIG. 2, the lift linkage 64 may be pivotably attached to the bracket 62 and the torque tube 40. Therefore, in operation, the lift linkage 64 may rotate with respect to the bracket 62 about the pivot axis 66 to raise or lower the vehicle seat 16 with respect to the floor 14.

Therefore, during the non-energy management condition 28 (FIG. 1), the vehicle seat 16 may be translatable along a vertical axis 68 that is substantially perpendicular to the horizontal axis 54 between the lowered position 22 (FIG. 1) in which the vehicle seat 16 is spaced apart from the rail 60 by a first distance 70 (FIG. 1), and the raised position 20 (FIG. 1) in which the vehicle seat 16 is spaced apart from the rail 60 by a second distance 72 (FIG. 1) that is greater than the first distance 70. Further, since the stabilization assembly 12, 112, 212 includes the slide assembly 52, the vehicle seat 16 may be translatable along the horizontal axis 54 between the fore position 24 (FIG. 1) and the aft position 26 (FIG. 1). That is, the rail 60 may translate within the channel 58 along the horizontal axis 54 to thereby translate the vehicle seat 16 between the fore position 24 and the aft position 26 based upon occupant preferences.

Therefore, the vehicle seat 16 may be both vertically adjustable between the lowered position 22 (FIG. 1) and the raised position 20 (FIG. 1) via the lift linkage 64, and longitudinally adjustable along a path of vehicle travel, i.e., along the horizontal axis 54, via the slide assembly 52. For example, the vehicle seat 16 may be characterized as a height-adjustable vehicle seat, also referred to as a lift-capable vehicle seat, and a position of the vehicle seat 16 along the vertical axis 68 may be adjusted via the lift linkage 64. It is also to be appreciated that the vehicle seat 16 may also be translatable between a plurality of raised positions 20 and lowered positions 22. For example, although not shown, the vehicle seat 16 may be translatable to the lowered position 22 (FIG. 1), one or more medium vertical positions, and the raised position 20 (FIG. 1).

The stabilization assembly 12 may also include a plurality of lift linkages 64. For example, the stabilization assembly 12 may include two lift linkages 64, and each of the two lift linkages 64 may be disposed at a rear of the seat cushion 42. Alternatively, although not shown, the stabilization assembly 12 may include four lift linkages 64 so that two lift linkages 64 may be disposed at the rear of the seat cushion 42 and two lift linkages 64 may be disposed at a front of the seat cushion 42.

In operation, as described with reference to FIG. 2, the lift linkage 64 is rotatable about the pivot axis 66, which is substantially perpendicular to the horizontal axis 54 and the vertical axis 68, in a first direction 74 to translate the vehicle seat 16 from the lowered position 22 (FIG. 1) to the raised position 20 (FIG. 1). Conversely, the lift linkage 64 is rotatable about the pivot axis 66 in a second direction 76 that is opposite the first direction 74 to translate the vehicle seat 16 from the raised position 20 to the lowered position 22. Therefore, in summary, the vehicle seat 16 may be translatable between the lowered position 22 and the raised position 20 as the lift linkage 64 rotates about the pivot axis 66, and may be translatable along the horizontal axis 54 between the fore position 24 and the aft position 26 as the rail 60 translates within the channel 58.

Referring again to FIG. 2, the stabilization assembly 12 also includes a locking sprocket 78 rotatable about the pivot axis 66 during the non-energy management condition 28 (FIG. 1), and not rotatable about the pivot axis 66 during the energy management condition 18 (FIG. 1). Stated differently, the locking sprocket 78 may be selectively rotatable about the pivot axis 66 according to operation of the stabilization assembly 12 during the energy management condition 18 to thereby minimize rotation of the lift linkage 64 with respect to the bracket 62 when the vehicle seat 16 is disposed in the raised position 20 (FIG. 1).

More specifically, the locking sprocket 78 and the lift linkage 64 may be rotatable about the pivot axis 66 in the first direction 74 and the second direction 76 during the non-energy management condition 28 (FIG. 1) so that the vehicle seat 16 may translate between the raised position 20 (FIG. 1) and the lowered position 22 (FIG. 1). In particular, the locking sprocket 78 and the lift linkage 64 may be rotatable about the pivot axis 66 in the first direction 74 during the non-energy management condition 28 (FIG. 1) to thereby translate the vehicle seat 16 to the raised position 20. Conversely, the locking sprocket 78 and the lift linkage 64 may be rotatable about the pivot axis 66 in the second direction 76 during the non-energy management condition 28 to thereby translate the vehicle seat 16 to the lowered position 22.

However, the vehicle seat 16 may not be translatable from the raised position 20 (FIG. 1) to the lowered position 22 (FIG. 1) during the energy management condition 18 (FIG. 1). That is, the locking sprocket 78 and the lift linkage 64 may not be rotatable about the pivot axis 66 in the second direction 76 (FIG. 2) during the energy management condition 18 so that the vehicle seat 16 is not translatable from the raised position 20 to the lowered position 22. Similarly, the vehicle seat 16 may not be translatable between the fore position 24 (FIG. 1) and the aft position 26 (FIG. 1) during the energy management condition 18. For example, the rail 60 may lock within the channel 58 so that the vehicle seat 16 may not translate along the horizontal axis 54 during the energy management condition 18.

Figure 5:
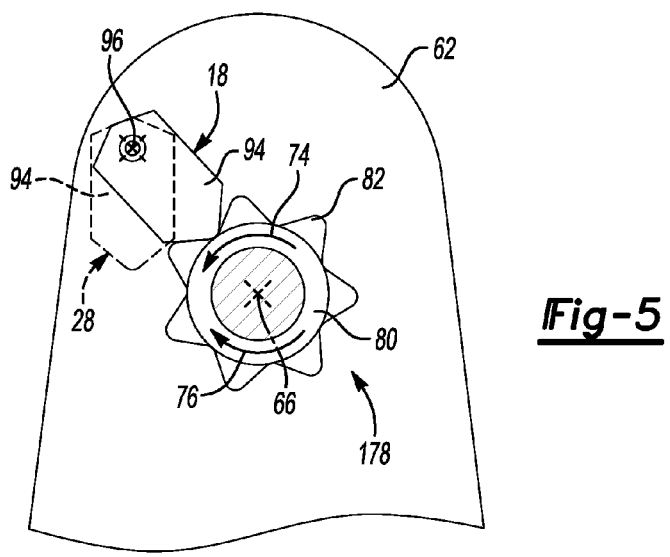
FIG. 5 is a schematic enlarged illustration of a side view of the locking sprocket of circle 5-5 of FIG. 4.
Figure 7:
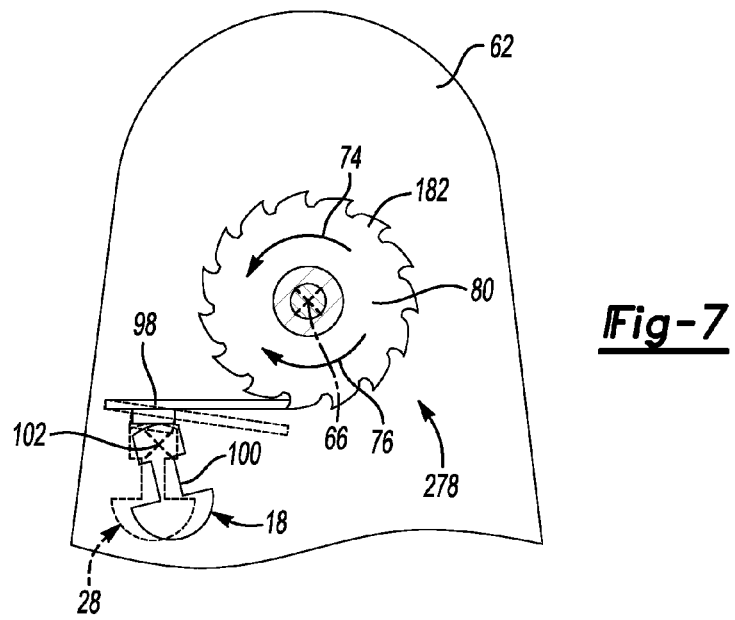
FIG. 7 is a schematic enlarged illustration of a side view of the locking sprocket of circle 7-7 of FIG. 6.

Referring now to FIGS. 2, 5, and 7, the locking sprocket 78, 178, 278 may be attached to the bracket 62, e.g., by a fastener 92 (FIG. 3), and may include a disc 80 (FIGS. 5 and 7) and a plurality of teeth 82, 182 (FIGS. 5, 7) extending radially from the disc 80. That is, the locking sprocket 78, 178, 278 may be characterized as a retention gear and may be configured for minimizing displacement of the bracket 62 along the vertical axis 68 (FIG. 3) and/or a change in shape of the bracket 62 during the energy management condition 18 (FIG. 1).

In one embodiment described with reference to FIG. 2, the stabilization assembly 12 further includes a brace 84 coupled to the lift linkage 64 and selectively rotatable about the pivot axis 66. For example, the brace 84 may be coupled to the locking sprocket 78 and may be rotatable about the pivot axis 66. As best shown in FIG. 3, the brace 84 may have an L-shaped configuration, and may include a first leg 86 mated to the lift linkage 64 and defining a bore 88 therethrough, and a second leg 90 extending away from and substantially perpendicular to the first leg 86. The second leg 90 may abut the track 56 during the energy management condition 18 (FIG. 1) so that the bracket 62 does not translate along the vertical axis 68. That is, the brace 84 may support the bracket 62 to minimize a change in shape or a downward displacement of the bracket 62 along the vertical axis 68 during the energy management condition 18.

With continued reference to FIG. 3, the stabilization assembly 12 may further include the fastener 92 coaxial with the pivot axis 66 and interconnecting the bracket 62, the lift linkage 64, the locking sprocket 78, and the brace 84. For example, the bore 88 defined by the first leg 86 may be configured for receiving the fastener 92 such that the fastener 92 interconnects the bracket 62, the lift linkage 64, the locking sprocket 78, and the brace 84.

Figure 4:
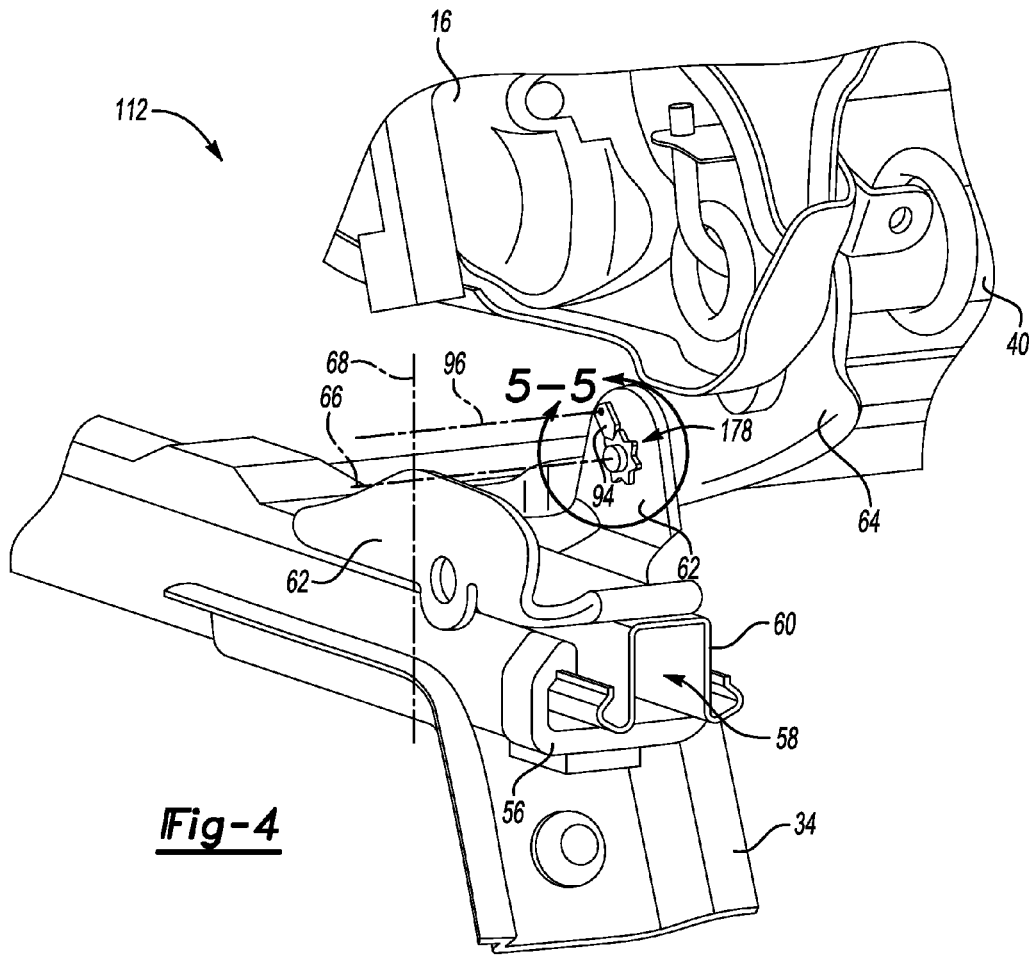
FIG. 4 is a schematic illustration of a partial perspective side view of another embodiment of the locking sprocket of FIGS. 2 and 3.

Referring now to FIGS. 4 and 5, in another embodiment, the stabilization assembly 112 may further include a counterweight 94 matable with at least one of the plurality of teeth 82 (FIG. 5) and rotatable about a central axis 96 that is parallel to the pivot axis 66. In operation during the energy management condition 18 (FIG. 5), as the external force 30 (FIG. 1) is applied to the vehicle 10 (FIG. 1), the counterweight 94 may swing about the central axis 96 and engage with at least one of the plurality of teeth 82 to thereby minimize or prevent rotation of the locking sprocket 178 about the pivot axis 66 so that the vehicle seat 16 (FIG. 4) and the bracket 62 may not translate along the vertical axis 68 (FIG. 4) to the lowered position 22 (FIG. 1). Conversely, during the non-energy management condition 28 (FIG. 5), the counterweight 94 may not swing toward the locking sprocket 178 and may not engage with the at least one of the plurality of teeth 82 to thereby allow passive rotation of the locking sprocket 178 about the pivot axis 66 so that the vehicle seat 16 and the bracket 62 may translate to the lowered position 22.

More specifically and as further described with reference to FIG. 5, during the energy management condition 18, as the external force 30 (FIG. 1) is applied to the vehicle 10 (FIG. 1), the vehicle seat 16 may pivot only momentarily about the pivot axis 66 in the first direction 74 and the counterweight 94 may swing about the central axis 96 in the second direction 76. However, as a weight of the occupant bears down against the vehicle seat 16, the vehicle seat 16 may attempt to pivot in the second direction 76, i.e., in a downward motion towards a rear of the vehicle 10. Concurrently, the counterweight 94 may rotate about the central axis 96 in the first direction 74 and abut or engage with at least one of the plurality of teeth 82. Such engagement may therefore minimize or prevent rotation of the locking sprocket 178 in the second direction 76, and may consequently minimize downward displacement of the vehicle seat 16 and bracket 62 along the vertical axis 68 (FIG. 4).

Figure 6:
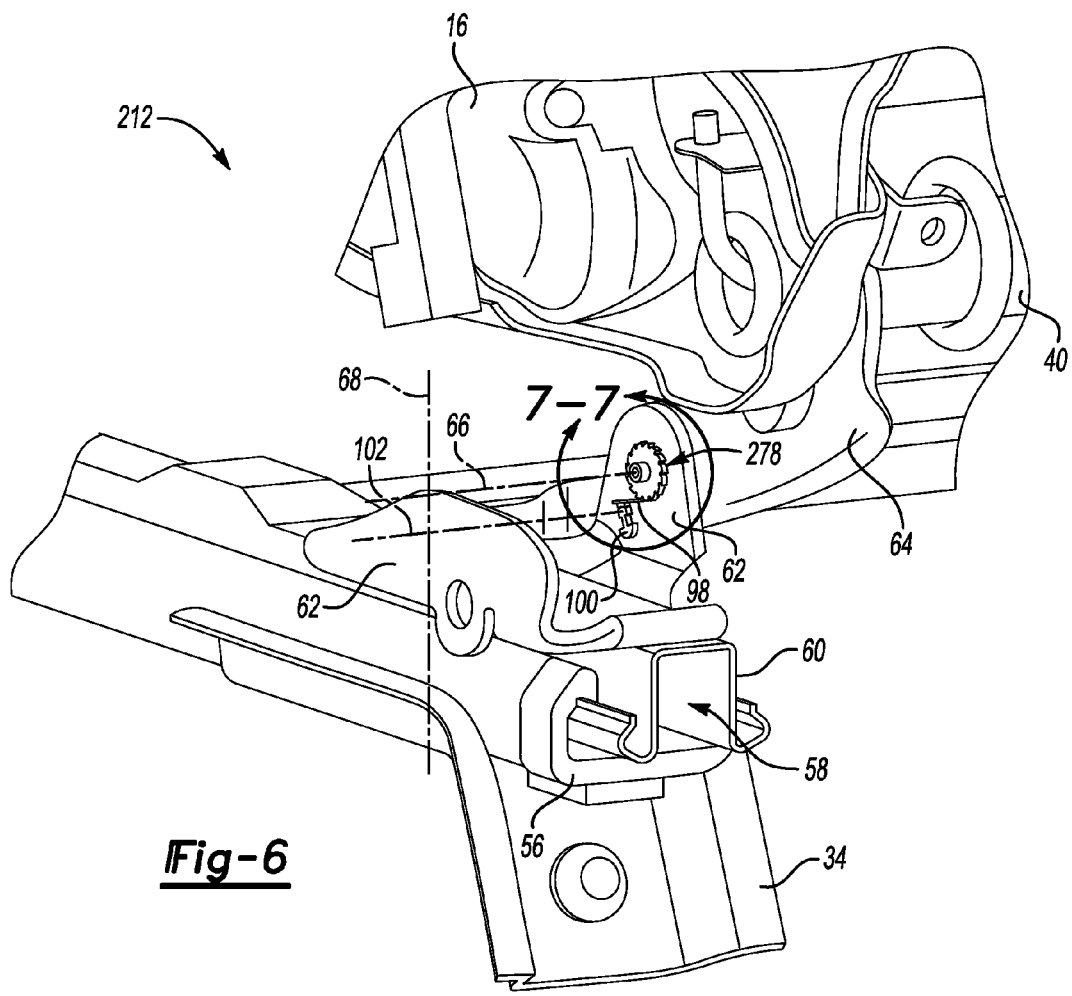
FIG. 6 is a schematic illustration of a partial perspective side view of an additional embodiment of the locking sprocket of FIGS. 2-5.

Referring now to FIGS. 6 and 7, in yet another embodiment, the stabilization assembly 212 may further include a lock bar 98 matable with at least one of the plurality of teeth 182 (FIG. 7), and a pendulum 100 abuttable with the lock bar 98 and rotatable about a center axis 102 that is parallel to the pivot axis 66. In operation during the energy management condition 18 (FIG. 7), as the external force 30 (FIG. 1) is applied to the vehicle 10 (FIG. 1), the pendulum 100 may swing about the center axis 102 and abut the lock bar 98. The lock bar 98 may in turn pivot and engage with at least one of the plurality of teeth 182 to thereby prevent rotation of the locking sprocket 278 about the pivot axis 66 so that the vehicle seat 16 and the bracket 62 may not translate along the vertical axis 68 (FIG. 6) to the lowered position 22 (FIG. 1). Conversely, during the non-energy management condition 28 (FIG. 7), the lock bar 98 may not engage the at least one of the plurality of teeth 182 to thereby allow passive rotation of the locking sprocket 278 about the pivot axis 66 so that the vehicle seat 16 and the bracket 62 may translate to the lowered position 22.

More specifically and as further described with reference to FIG. 7, during the energy management condition 18 as the external force 30 (FIG. 1) is applied to the vehicle 10 (FIG. 1), the pendulum 100 may swing about the center axis 102 in the first direction 74. However, as a weight of the occupant bears down against the vehicle seat 16, the vehicle seat 16 may attempt to pivot in the second direction 76, i.e., in a downward motion towards the rear of the vehicle 10. Concurrently, as the pendulum 100 pivots about the center axis 102, the lock bar 98 may engage with at least one of the plurality of teeth 182. Such engagement may therefore minimize or prevent rotation of the locking sprocket 278 in the second direction 76, and may consequently minimize downward displacement of the vehicle seat 16 and bracket 62 along the vertical axis 68 (FIG. 6).

It is to be appreciated that the stabilization assembly 12, 112, 212 may also include a plurality of locking sprockets 78, 178, 278, braces 84, counterweights 94, pendulums 100, and/or lock bars 98. For example, the stabilization assembly 12, 112, 212 may include two locking sprockets 78, 178, 278 disposed at the rear of the vehicle seat 16. Alternatively, the stabilization assembly 12, 112, 212 may include four locking sprockets 78, 178, 278 so that two locking sprockets 78, 178, 278 may be disposed at the rear of the vehicle seat 16 and two locking sprockets 78, 178, 278 may be disposed at the front of the vehicle seat 16.

As such, a method of stabilizing the vehicle seat 16 includes translating the vehicle seat 16 along the vertical axis 68 during the non-energy management condition 28 between the lowered position 22 and the raised position 20, and translating the vehicle seat 16 along the horizontal axis 54 during the non-energy management condition 28 between the fore position 24 and the aft position 26 via the slide assembly 52. That is, translating the vehicle seat 16 along the vertical axis 68 may be concurrent to translating the vehicle seat 16 along the horizontal axis 54 during the non-energy management condition 28. In addition, the method includes activating the stabilization assembly 12, 112, 212 during the energy management condition 18 to minimize deformation of the bracket 62, minimize translation of the vehicle seat 16 to the lowered position 22, and thereby stabilize the vehicle seat 16. As set forth above, the method may also include rotating the locking sprocket 78, 178, 278 about the pivot axis 66 during the non-energy management condition 28. In addition, the method may further include minimizing rotation of the locking sprocket 78, 178, 278 about the pivot axis 66 during the energy management condition 18.

Therefore, the vehicle 10 and stabilization assembly 12, 112, 212 are configured to minimize downward displacement of the vehicle seat 16 (FIG. 1) and/or energy absorption of the bracket 62 during the energy management condition 18 (FIG. 1). That is, upon application of the external force 30 (FIG. 1) to the vehicle 10, if the vehicle seat 16 and/or bracket 62 attempt to translate toward the floor 14 (FIG. 1) along the vertical axis 68 (FIG. 2), e.g., from the raised position 20 (FIG. 1) to the lowered position 22 (FIG. 1), the locking sprocket 78, 178, 278 may resist such movement of the vehicle seat 16 and/or bracket 62. For example, the brace 84 (FIGS. 2 and 3) may support the bracket 62 during the energy management condition 18. Therefore, the stabilization assembly 12, 112, 212 may compensate for the external force 30 applied to the vehicle 10 during the energy management condition 18 and may minimize an unsuitable position or shape of the bracket 62 during energy absorption.

Additionally, since the locking sprocket 78, 178, 278 is passively rotatable about the pivot axis 66 (FIG. 2) in both the first direction 74 (FIG. 2) and the second direction 76 (FIG. 2) during the non-energy management condition 28, the vehicle seat 16 is adjustable by the occupant between the raised position 20 and the lowered position 22, and between the fore position 24 (FIG. 1) and the aft position 26 (FIG. 1) with ease. Therefore, the stabilization assembly 12, 112, 212 may not be perceived by the occupant during vehicle operation. Further, since the stabilization assembly 12, 112, 212 is self-contained and easily installed in the vehicle 10, the stabilization assembly 12, 112, 212 is cost-effective.

While the best modes for carrying out the disclosure have been described in detail, those familiar with the art to which this disclosure relates will recognize various alternative designs and embodiments for practicing the disclosure within the scope of the appended claims.

The invention claimed is:

1. A stabilization assembly for a vehicle, the stabilization assembly comprising:
   a vehicle seat including:
      a first frame member;
      a second frame member spaced opposite the first frame member; and
      a torque tube disposed between and attached to the first frame member and the second frame member;
   a slide assembly including:
      a track defining a channel therein;
      a rail translatable within the channel; and
      a bracket attached to the rail;
   a lift linkage interconnecting the vehicle seat and the slide assembly, wherein the lift linkage is attached to the bracket and the torque tube and is rotatable with respect to the bracket about a pivot axis; and
   a locking sprocket attached to the bracket, wherein the locking sprocket is rotatable about the pivot axis during a non-energy management condition and is not rotatable about the pivot axis during an energy management condition.

2. The stabilization assembly of claim 1, wherein the vehicle seat is translatable along a vertical axis during the non-energy management condition between a lowered position in which the vehicle seat is spaced apart from the rail by a first distance and a raised position in which the vehicle seat is spaced apart from the rail by a second distance that is greater than the first distance.

3. The stabilization assembly of claim 2, wherein the vehicle seat is not translatable from the raised position to the lowered position during the energy management condition.

4. The stabilization assembly of claim 3, wherein the locking sprocket includes a disc and a plurality of teeth extending radially from the disc.

5. The stabilization assembly of claim 4, further including a counterweight matable with at least one of the plurality of teeth and rotatable about a central axis that is parallel to the pivot axis.

6. The stabilization assembly of claim 4, further including:
   a lock bar matable with at least one of the plurality of teeth; and
   a pendulum abuttable with the lock bar and rotatable about a center axis that is parallel to the pivot axis.

7. The stabilization assembly of claim 4, further including a brace coupled to the lift linkage and selectively rotatable about the pivot axis.

8. The stabilization assembly of claim 7, wherein the brace includes a first leg mated to the lift linkage and defining a bore therethrough, and a second leg extending away from and substantially perpendicular to the first leg.

9. The stabilization assembly of claim 8, wherein the second leg abuts the track during the energy management condition so that the bracket does not translate along the vertical axis.

10. The stabilization assembly of claim 2, wherein the vehicle seat is translatable between the lowered position and the raised position as the lift linkage rotates about the pivot axis, and wherein the vehicle seat is translatable along a horizontal axis that is substantially perpendicular to the vertical axis between a fore position and an aft position as the rail translates within the channel.

11. The stabilization assembly of claim 10, wherein the pivot axis is substantially perpendicular to the horizontal axis and the vertical axis.

12. The stabilization assembly of claim 10, wherein the vehicle seat is not translatable between the fore position and the aft position during the energy management condition.

13. The stabilization assembly of claim 2, wherein the locking sprocket and the lift linkage are rotatable about the pivot axis in a first direction during the non-energy management condition to thereby translate the vehicle seat to the raised position.

14. The stabilization assembly of claim 13, wherein the locking sprocket and the lift linkage are rotatable about the pivot axis in a second direction that is opposite the first direction during the non-energy management condition to thereby translate the vehicle seat to the lowered position.

15. The stabilization assembly of claim 13, wherein the locking sprocket and the lift linkage are not rotatable about the pivot axis in a second direction that is opposite the first direction during the energy management condition.

16. A stabilization assembly for a vehicle, the stabilization assembly comprising:
a vehicle seat including:
a first frame member;
a second frame member spaced opposite the first frame member; and
a torque tube disposed between and attached to the first frame member and the second frame member;
wherein the vehicle seat is translatable along a vertical axis between a lowered position and a raised position, and wherein the vehicle seat is translatable along a horizontal axis that is substantially perpendicular to the vertical axis between a fore position and an aft position;
a slide assembly including:
a track defining a channel therein;
a rail translatable within the channel along the horizontal axis; and
a bracket attached to the rail;
a lift linkage interconnecting the vehicle seat and the slide assembly, wherein the lift linkage is attached to the bracket and the torque tube and is rotatable with respect to the bracket about a pivot axis that is substantially perpendicular to the horizontal axis and the vertical axis;
wherein the lift linkage is rotatable about the pivot axis in a first direction to translate the vehicle seat from the lowered position to the raised position, and in a second direction that is opposite the first direction to translate the vehicle seat from the raised position to the lowered position;
a locking sprocket attached to the bracket; and
a brace coupled to the lift linkage and selectively rotatable about the pivot axis;
wherein the locking sprocket and the lift linkage are rotatable about the pivot axis in the first direction and the second direction during a non-energy management condition so that the vehicle seat is translatable between the raised position and the lowered position;
wherein the locking sprocket and the lift linkage are not rotatable about the pivot axis in the second direction during an energy management condition so that the vehicle seat is not translatable from the raised position to the lowered position.

17. The stabilization assembly of claim 16, wherein the brace abuts the track during the energy management condition so that the bracket does not translate along the vertical axis.

18. The stabilization assembly of claim 16, further including a fastener coaxial with the pivot axis and interconnecting the bracket, the lift linkage, the locking sprocket, and the brace.

19. The stabilization assembly of claim 18, wherein the brace includes a first leg defining a bore therethrough that is configured for receiving the fastener, and a second leg extending away from and substantially perpendicular to the first leg.

20. A vehicle comprising:
a floor;
a plurality of mounts attached to the floor; and
a stabilization assembly attached to the plurality of mounts and including:
a vehicle seat including:
a first frame member;
a second frame member spaced opposite the first frame member; and
a torque tube disposed between and attached to the first frame member and the second frame member;
a slide assembly including:
a track defining a channel therein and coupled to the plurality of mounts;
a rail translatable within the channel; and
a bracket attached to the rail;
a lift linkage interconnecting the vehicle seat and the slide assembly, wherein the lift linkage is attached to the bracket and the torque tube and is rotatable with respect to the bracket about a pivot axis; and
a locking sprocket attached to the bracket, wherein the locking sprocket is rotatable about the pivot axis during a non-energy management condition and is not rotatable about the pivot axis during an energy management condition.

* * * * *